United States Patent

Ohuchi et al.

[11] 3,901,804
[45] Aug. 26, 1975

[54] METHOD FOR PROCESSING SLUDGE

[75] Inventors: Motohiro Ohuchi; Tojiro Kitahori, both of Hyogo; Toshinari Maitoko, Yokohama; Katuhiro Mizuguchi, Kanagawa, all of Japan

[73] Assignees: Kanzaki Paper Manufacturing Co., Ltd., Hyogo; Niigata-Zimpro Limited, Tokyo, both of Japan

[22] Filed: Oct. 24, 1973

[21] Appl. No.: 409,149

[30] Foreign Application Priority Data
Oct. 24, 1972 Japan............................ 47-106801

[52] U.S. Cl. ................. 210/50; 210/53; 210/63
[51] Int. Cl.$^2$ ................ B01D 21/01; C02B 1/20
[58] Field of Search ........... 210/10, 51, 63, 70, 71, 210/50, 53

[56] References Cited
UNITED STATES PATENTS

| | | |
|---|---|---|
| 2,824,058 | 2/1958 | Zimmermann ..................... 210/63 |
| 3,142,638 | 7/1964 | Blaisdell et al. ................. 210/51 X |
| 3,288,707 | 11/1966 | Hurwitz et al. .................. 210/10 X |
| 3,474,033 | 10/1969 | Stout et al. ..................... 210/51 X |
| 3,549,529 | 12/1970 | Wiseman .......................... 210/63 |
| 3,761,409 | 9/1973 | McCoy et al. .................... 210/63 |

*Primary Examiner*—Samih N. Zaharna
*Assistant Examiner*—Robert H. Spitzer
*Attorney, Agent, or Firm*—Armstrong, Nikaido & Wegner

[57] ABSTRACT

The pH of the sludge resulting from coagulation-separation treatment of wastewater utilizing a coagulant substantially consisting of a water soluble aluminum compound is adjusted before subjecting the sludge to a wet air oxidation treatment so that the pH of the sludge obtained after said wet air oxidation treatment is either below 1.5 or above 9.0, whereby the coagulant substantially consisting of an aluminum compound can be recovered in the form of a soluble aluminum compound.

10 Claims, 2 Drawing Figures

METHOD FOR PROCESSING SLUDGE

BACKGROUND OF THE INVENTION

This invention relates to a treatment of industrial wastewater and more particularly to a method of processing sludge resulting from coagulation-separation treatment of wastewater using a coagulant which comprises an aluminum compound or aluminum compounds in which the sludge resulting from the wastewater treatment is subjected to wet air oxidation treatment under a special condition, and that aluminum compounds in the treated sludge are recovered to reuse.

Recently the environmental pollution caused by the industrial wastewater has become a big social problem. As for the wastewater treatment, the chemical coagulation process is recommendable in consideration of its high clarifying effect. In the chemical coagulation process, water and sludge are separated by sedimentation or floatation process after pollutants in wastewater are coagulated by chemicals. Thus wastewater is clarified. This process, however, has some problems in practical operation. Due to such problems, the said process cannot be put into practice popularly.

One problem is that high cost of coagulant causes high running costs of wastewater treatment. For instance, when the pulp mill effluent, which has high BOD and dark color as its characteristics, is treated biochemically, the color becomes rather darker due to the oxidation of organic matter. Judging from its appearance, said wastewater does not give an impression that it is clarified. Therefore coagulation process has been mainly taken as a treatment method having a good effect on color reductions, and chemicals such as aluminum sulfate, ferrous sulfate, ferric chloride, calcium hydroxide, etc. have been used as coagulants. The treatment cost, however, is rather high to obtain the desired effect in using any of chemicals above. Though such a method is suggested that industrial wastes such as carbide sludge and titanium slag are used as cheaper coagulants, it does not always contribute to treating wastewater satisfactorily and cannot be a popular method yet because use of those waste chemicals is remarkably restricted depending on the location of the mill.

Another problem is the treatment of resultant sludge. In the wastewater treatment process, the solid matter separated from water and concentrated thereafter are always disposed of as sludge more or less. Such disposal of sludge has become a big problem with wastewater treatment. Sludge discharge to the ocean is no longer allowed in view of pollution control regulations. Use of sludge for land-fill or burying in the ground will be restricted in terms of quantity and besides it is very costly to transport them thereto. Because the sludge is extremely bulky and compressible, concentration and dewatering of sludge is difficult. Dewatering in the process of treating sludge needs large equipment such as vacuum filter, pressure filter and centrifuge, moreover it often needs filter-aid such as lime or diatomaceous earth. Even if the sludge is dewatered in spite of those problems, direct disposal of dewatered sludge is nearly impossible, and for burning up the sludge, the great amount of fuel is required, because the obtained cake of dewatered sludge has high moisture contents and the form of mud. Furthermore useful chemicals such as clarification treatment agents are discharged retained in the sludge; these facts make the treatment itself costly and the economic charge will be enormous.

On the other hand, the method of recovering coagulants comprising the steps of drying the sludge after concentration and dewatering until it becomes burnable, burning to ashes by conventional method and recovering the coagulants from ashes also has disadvantages. That is, not only the increase of cost arises from dewatering-drying of sludge until it becomes burnable but also kinds of coagulants to be used are restricted in terms of the solubility of ash. In other words, aluminum compounds and iron compounds which are typical coagulants produce aluminum oxide and ferric oxide which are insoluble to acid and alkali under the normal temperature for burning up. It is impossible to reuse such coagulants by recovering. Only an embodiment of zinc compounds is commonly known.

As an example of the wastewater clarification process using aluminum compounds, such a method is suggested that aluminum compounds which are retained in the dewatered sludge are recovered after dissolving them in acid or alkali. The said method, however, has such disadvantages: In the case that pollutants in sludge comprised organic colloidal materials as pulp mill effluent, organic colloid is dissolved again by addition of acid or alkali and the result is quite opposite to the purpose of the treatment. Also in the case that less organic matter is contained, organic matter dissolved again is accumulated in the circulating system while it is recirculated. Though the method of treating sludge by wet air oxidation is recently suggested, it cannot solve the problem of the recovery of coagulant at all.

For instance, pollutants in the wastewater are allowed to precipitate with use of aluminum compound as coagulant, and thereafter the wet air oxidation treatment of the resultant sludge causes aluminum compound to precipitate in the form of $\alpha$-boehmite. The said $\alpha$-boehmite can not be reused by recovery as it is insoluble in acid and alkali.

SUMMARY OF THE INVENTION

According to the invention, the pH of the sludge resulting from coagulation-separation treatment of water utilizing a coagulant substantially consisting of a water-soluble aluminum compound is so adjusted before subjecting said sludge to a wet air oxidation treatment that the pH of the sludge obtained after said wet air oxidation treatment is either below 1.5 or above 9.0.

As the result of inventor's study, it was found that $\alpha$-boehmite is formed in the pH range of 1.5 to 9.0, that the added aluminum exists in water in the form of aluminum ion at the pH range of below 1.5 and in the form of aluminate ion at the pH range of above 10.5 and that aluminum hydroxide is formed at the pH range of 9.0 to 10.5. Aluminum hydroxide is soluble in an acid or alkali solution. According to the invention, after the wastewater is clarified by chemical coagulation process, the resultant sludge is subjected to wet air oxidation treatment in the condition that pH ranges of wet air oxidized sludge should be controlled at below 1.5 and above 9.0. The wet air oxidation treatment is, per se, known, for example, as disclosed in "ZIMPRO WET AIR OXIDATION UNITS" by ZIMPRO Division of Sterling Drug Inc., 1968. During such wet air oxidation treatment water soluble aluminum compounds can be prevented from forming insoluble matter to acid and alkali, water-soluble aluminum compounds are recovered efficiently and the recovered aluminum compounds can be reused by adding them to untreated waste-water. Consequently the cost of coagulants can be much decreased in the present invention and besides the recovery of sludge solves the environmental problem of pollution. Thus the wastewater treatment above can be carried out in a very practical way.

As the coagulant for carrying out the coagulation-separation treatment of wastewater, any water-soluble aluminum compound can be used. Among those aluminum compounds there may be included aluminum sulfate, aluminum chloride, sodium aluminate, alum and polyaluminum chloride. The aluminum compound coagulant may be used alone. However, in some or many cases the aluminum compound coagulant may be used together with a flocculation aid depending on the properties on wastewater. Among the flocculation aids which can be used with the aluminum compound coagulant there may be included calcium hydroxide, soda ash, active silica, and synthetic high polymer such as polyacrylamide, sodium polyacrylate and polyvinylpyridine hydrochloride.

As mentioned above, in the present invention it is important to control the pH in proper range to prevent the insoluble aluminum compounds such as α-boehmite from forming in the oxidized sludge after wet air oxidation treatment. For that purpose the pH of sludge is adjusted beforehand to keep the pH of oxidized sludge at the range below 1.5 or above 9.0.

BRIEF DESCRIPTION OF THE DRAWINGS

In the attached drawings.

PREFERRED EMBODIMENTS OF THE INVENTION

Figure 2:
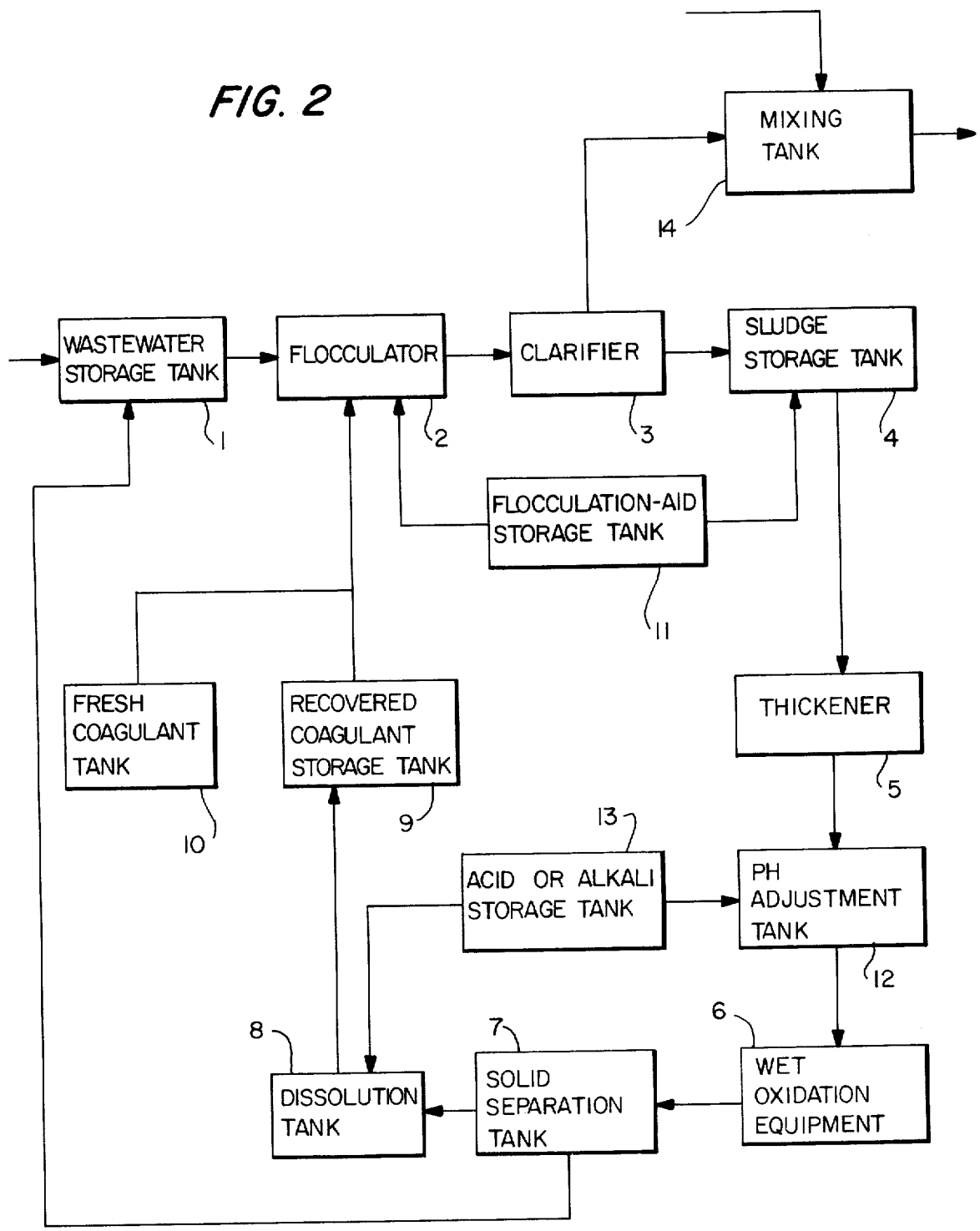
FIG. 2 is a flowsheet of wastewater treatment process in which the process according to the invention is included.

Referring to the drawings, a flowsheet of wastewater treatment by the method of the present invention is illustrated in FIG. 2. The wastewater is fed from the wastewater storage tank 1 to the flocculator 2, where the coagulants comprising aluminum compounds are added with stirring to cause flocculation, supplying from the recovered coagulant tank 9, or, according to the occasions, from the fresh coagulant tank 10. If necessary, flocculation aid such as synthetic polyelectrolyte can be also added from the flocculation aid storage tank 11 to accelerate flocculation. The wastewater which completed the coagulation is separated into the sludge and clean water in the clarifier 3. The sedimentation type clarifier or the floatation separator are applicable as clarifier above. The clarified water therein is discharged after mixing together with untreated wastewater and, if necessary, adjusting pH in the mixing tank 14. On the other hand, the separated sludge is once stored in the sludge storage tank 4 and then transferred directly, or through the thickener 5 as occasion demands, to the pH adjustment tank 12. As the thickener is objected to concentrate sludge until enough to be self-burnable in wet air oxidation equipment, rotary screen thickener with relatively large meshes will be of use in the case that polyelectrolyte is added to the said sludge. The pH adjustment tank 12, acid or alkali is added from the acid or alkali storage tank 13 to adjust pH of wet air oxidized sludge to below 1.5 or above 9.0 beforehand and the sludge is fed to the wet air oxidation equipment 6, in which organic matter of sludge is decomposed to harmless water and carbonic acid. The oxidized sludge is heat-exchanged with fresh sludge to be fed and after cooling, it is discharged from wet air oxidation equipment. Here, because aluminum compounds exist dissolved in the oxidized sludge in the pH range of below 1.5 or above 10.5, it can be directly recovered and transferred to the recovered coagulant storage tank 9 to be reused for wastewater treatment. In the pH range of 9.0 to 10.5, because aluminum compounds precipitate in the form of aluminum hydroxide, it is transferred to the dissolution tank 8 directly or through the solid separation tank 7, and it is dissolved by acid or alkali from the acid or alkali storage tank 13, and then transferred to the recovered coagulant storage tank 9. As water separated in the solid separation tank 7 is relatively polluted, it would be desirable to apply coagulation clarification treatment after mixing together with untreated wastewater rather than discharge immediately. Though in the above embodiment the process for treating wastewater discharged from paper and pulp mill is mentioned, this invention can be broadly applied to the wastewater treatment using aluminum compounds.

Examples of this invention are given in the following:

EXAMPLE 1

Aluminum sulfate was added by 50 p.p.m. as aluminum oxide into the wastewater of unbleached hardwood kraft pulp ($COD_{cr}$ 800 p.p.m.). By adjusting the pH thereof to 4.5, the resultant coagulated flocs were sedimented and separated as sludge. Polyacrylamide was added to the obtained sludge by 1 p.p.m. as dry solid on the said wastewater. Thereafter the sludge was a little concentrated by rotary screen (100 mesh wire) and the sludge concentration was adjusted to 5.0%. At this stage, pH of the sludge was 4.5, and $COD_{cr}$ was 52270 p.p.m. By adding $H_2SO_4$ in an amount of 2 wt % on the basis of the total weight of sludge to the said sludge, pH thereof was adjusted to 1.2. The 500 ml sample of said sludge adjusted to pH 1.20 was subjected to wet air oxidation treatment in a vibrating laboautoclave (capacity 800 ml) in the condition of initial pressure (air) of 30 kg/cm² and temperature of 175°C for 60 minutes. The obtained oxidized sludge was brown and the pH thereof was 1.20. $COD_{cr}$ of the said oxidized liquer was determined to examine the effectivity of oxidation.

After the said oxidized sludge was separated into filtrate and residue by filtration, the quantity of aluminum in the said filtrate (A) was determined by atomic absorption photometry. After $Al(OH)_3$ in the said residue was dissolved in HCl, the quantity of aluminum therein (B) was determined by atomic absorption photometry.

The results therefrom are shown in Table 1.

EXAMPLE 2

This example was similar to Example 1 except that NaOH was added in an amount of 6 wt % on the basis of the sludge the total weight of sludge to adjust the pH of sludge to 13.8, and that the wet air oxidation treatment was carried out under the condition of initial pressure of 50 kg/cm² and temperature of 250°C. The results were shown in Table 1.

EXAMPLE 3

This example was similar to Example 1 except that NaOH was added in an amount of 7.5 wt % on the basis of the sludge the total weight of sludge to adjust the pH of sludge to 13.9, and that the wet air oxidation treatment was carried out under the condition of initial pressure of 50kg/cm² and temperature of 250°C. The results were shown in Table 1.

Control 1

EXAMPLE 3

This example was similar to Example 1 except that NaOH was added in an amount of 7.5 wt % on the basis of the sludge the total weight of sludge to adjust the pH of sludge to 13.9, and that the wet air oxidation treatment was carried out under the condition of initial pressure of 50kg/cm² and temperature of 250°C. The results were shown in Table 1.

The concentrated sludge (5%) in Example 1 was subjected to wet air oxidation treatment without preliminary pH adjustment under the condition of initial pressure of 50 kg/cm² and temperature of 200°C. The pH of resultant oxidized sludge was 2.03. COD and aluminum were determined in the same manner as in Example 1.

Control 2

Sulfuric acid was added to the concentrated sludge (5%) to adjust the pH to 13.4. This sludge was subjected to wet air oxidation treatment under the condition of initial pressure of 50 kg/cm² and temperature of 250°C for 60 minutes. The pH of resultant oxidized sludge was 7.40. COD and aluminum in the sludge were determined in the same manner as in Example 1. The results were shown in Table 1.

pH below 1.5. In the oxidized sludge of pH 1.5 to 9.0, aluminum precipitates in the form of α-boehmite [α-$Al_2(OOH)_2$]. As α-boehmite has only poor solubility to acid and alkali, it is actually impossible to recover and reuse it. At the pH 9.0 to 10.5, aluminum precipitates in the form of aluminum hydroxide. But the said aluminum hydroxide can be easily dissolved and recovered by adding acid or alkali directly or after dewatering by filtration according to the occasions. In the case of the pH above 10.5, aluminum is dissolved again as sodium alminate. Aluminum compounds recovered as above mentioned can be reused as coagulants.

What we claim is:

1. In a method of treating wastewater wherein the wastewater is treated with a coagulant consisting essentially of a water-soluble aluminum compound and sludge resulting from such treatment is separated and subjected to a wet air oxidation treatment, the improvement comprising adjusting the pH of the sludge prior to said wet air oxidation treatment so that the sludge obtained therefrom has a pH value of less than about 1.5, whereby water-soluble aluminum compounds are formed in the oxidized sludge, and thereafter separating said water-soluble aluminum compounds from the sludge.

2. A method of treating wastewater according to claim 1 in which said coagulant is selected from the group consisting of aluminum sulfate, aluminum chloride, sodium aluminate alum, polyaluminum chloride, and mixtures thereof.

3. A method of treating wastewater according to claim 1 in which said coagulant is used together with a flocculation aid selected from the group consisting of calcium hydroxide, soda ash, active silica, polyacrylamide, sodium polyacrylate, and polyvinylpyridine hydrochloride.

4. In a method of treating wastewater wherein the wastewater is treated with a coagulant consisting essen-

|  | Original Sludge | Oxidized Sludge | | | | |
|---|---|---|---|---|---|---|
|  |  | Example of this invention | | | | |
|  |  | I | II | III | I | II |
| Condition of pH Adjustment of Sludge |  |  |  |  |  |  |
| NaOH add.(%) on Sludge |  |  | 6.0 | 7.5 |  | 2.5 |
| $H_2SO_4$ add.(%) on Sludge |  | 2.0 |  |  |  |  |
| PH of Sludge | 4.5 | 1.2 | 13.8 | 13.9 | 4.5 | 13.4 |
| Condition of Wet Air Oxidation |  |  |  |  |  |  |
| Initial Pressure |  |  |  |  |  |  |
| —Air (Kg/cm²) |  | 30 | 50 | 50 | 50 | 50 |
| Temperature (°C) |  | 175 | 250 | 250 | 200 | 250 |
| Retention Time (min.) |  | 60 | 60 | 60 | 60 | 60 |
| Properties of Oxidized Sludge |  |  |  |  |  |  |
| Colour | Dark Brown | Brown | Pale Yellow | Yellow | Light Brown | Pale Yellow |
| PH |  | 1.2 | 9.5 | 11.2 | 2.0 | 7.4 |
| C.O.D. (cr)(mg/l) | 52,270 | 14,685 | 15,991 | 14,008 | 10,630 | 18,991 |
| COD Removal (%) |  | 71.9 | 69.4 | 73.2 | 79.7 | 67.3 |
| Aluminum Ion A (mg/l) | 27 | 3,215 | 632 | 3,122 | 466 | 23 |
| Soluble Aluminum Compounds |  |  |  |  |  |  |
| B (mg/l) | 3,672 | 11 | 2,190 | 185 | 15 | 132 |
| A + B (mg/l) | 3,699 | 3,226 | 2,822 | 3,307 | 481 | 155 |
| Recovery of Aluminum Compounds (%) |  | 87.2 | 76.3 | 89.4 | 13.0 | 4.2 |

Figure 1:
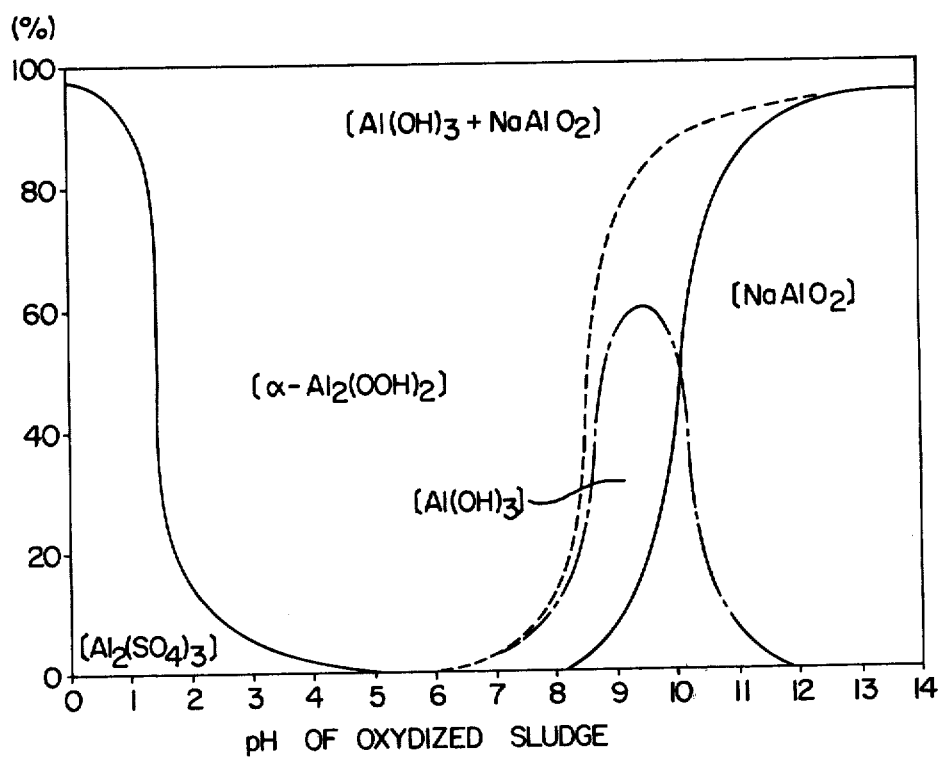
FIG. 1 illustrates the pH of the oxidized sludge, principle forms of aluminum compounds and recovery ratio of aluminum in the embodiments according to the invention.

FIG. 1 shows the relation between the pH of the resultant oxidized sludge, principal forms of aluminum compounds and quantity of aluminum ion dissolved in the oxidized sludge.

It will be observed from FIG. 1 most aluminums are dissolved as aluminum sulfate in the oxidized sludge of tially of a water-soluble aluminum compound and sludge resulting from such treatment is separated and subjected to a wet air oxidation treatment, the improvement comprising adjusting the pH of the sludge prior to said wet air oxidation treatment so that the sludge obtained therefrom has a pH value within the range of about 9.0 to 10.5, whereby aluminum hydroxide is formed in the oxidized sludge, and thereafter separating said aluminum hydroxide from the sludge.

5. A method of treating wastewater according to claim 4 wherein said improvement includes the further step of adding an acid or alkali to said sludge obtained after said wet air oxidation treatment to dissolve aluminum hydroxide included in said sludge.

6. A method of treating wastewater according to claim 1 in which said coagulant is selected from the group consisting of aluminum sulfate, aluminum chloride, sodium aluminate alum, polyaluminum chloride, and mixtures thereof.

7. A method of treating wastewater according to claim 4 in which said coagulant is used together with a flocculation aid selected from the group consisting of calcium hydroxide, soda ash, active silica, polyacrylamide, sodium polyacrylate, and polyvinylpyridine hydrochloride.

8. In a method of treating wastewater wherein the wastewater is treated with a coagulant consisting essentially of a water-soluble aluminum compound and sludge resulting from such treatment is separated and subjected to a wet air oxidation treatment, the improvement comprising adjusting the pH of the sludge prior to said wet air oxidation treatment so that the sludge obtained therefrom has a pH value of greater than about 10.5 whereby water-soluble aluminum compounds are formed in the sludge, and thereafter separating said water-soluble aluminum compounds from the sludge.

9. A method of treating wastewater according to claim 8 in which said coagulant is selected from the group consisting of aluminum sulfate, aluminum chloride, sodium aluminate alum, polyaluminum chloride, and mixtures thereof.

10. A method of treating wastewater according to claim 8 in which said coagulant is used together with a flocculation aid selected from the group consisting of calcium hydroxide, soda ash, active silica, polyacrylamide, sodium polyacrylate, and poly polyvinylpyridine hydrochloride.

* * * * *

UNITED STATES PATENT OFFICE
CERTIFICATE OF CORRECTION

Patent No. 3,901,804            Dated August 26, 1975

Inventor(s) MOTOHIRO OHUCHI ET AL

It is certified that error appears in the above-identified patent and that said Letters Patent are hereby corrected as shown below:

Column 5, delete lines 14 to 21.

Claim 6, line 2: change "claim 1" to --claim 4--.

Claim 10, line 5: delete "poly" after "and".

In Figure 2 and in the figure of the abstract page, change "WET OXIDATION EQUIPMENT" (reference numeral 6)

to --WET AIR OXIDATION EQUIPMENT--.

Signed and Sealed this twenty-seventh Day of January 1976

[SEAL]

Attest:

RUTH C. MASON
Attesting Officer

C. MARSHALL DANN
Commissioner of Patents and Trademarks